United States Patent [19]

Fuchs et al.

[11] 4,415,325

[45] Nov. 15, 1983

[54] FOLDING OF FLAT SHEET TO EXACT INTERIOR HEIGHT

[75] Inventors: Gilbert Fuchs; Norman Crowley; Randall Wink, all of Evansville, Ind.

[73] Assignee: Evana Tool & Engineering Inc., Evansville, Ind.

[21] Appl. No.: 270,873

[22] Filed: Jun. 5, 1981

[51] Int. Cl.³ .............................................. B29C 24/00

[52] U.S. Cl. ..................................... 425/397; 264/339

[58] Field of Search ......................... 264/339; 425/397

[56] References Cited

U.S. PATENT DOCUMENTS

| | | | |
|---|---|---|---|
| 2,892,217 | 6/1959 | Luboshez | 264/339 X |
| 4,153,665 | 5/1979 | Vecchiotti | 264/339 X |
| 4,272,235 | 6/1981 | Barnett | 425/397 |

*Primary Examiner*—Thomas P. Pavelko
*Attorney, Agent, or Firm*—Larson and Taylor

[57] ABSTRACT

A folding apparatus and method for folding a flat sheet so that an exact interior height is provided between the two folded portions is disclosed. The flat sheet is folded about a shim having a folding edge which is rounded and which has a thickness corresponding to the desired interior height. The flat shim is positioned on the flat sheet with the edge of the shim located along the line where the fold in the sheet is to be made. Initially, the portion of the sheet away from the shim is folded approximately 90° by tangential bending on the folding edge of the shim. Next, a die having a facing edge mating with the folding edge of the shim is pushed onto the folding edge of the shim. The portion of the sheet which was folded 90° is thus folded onto the top of the shim to approximately 180°. With this two step folding, an exact interior height adjacent the fold is provided. The method and apparatus of the present invention is conveniently used for forming flat jackets having an exact interior height. A plurality of these flat jackets can be formed by providing a plurality of forming devices on a turntable where each step of the forming process is sequentially performed.

19 Claims, 16 Drawing Figures

FIG. 13
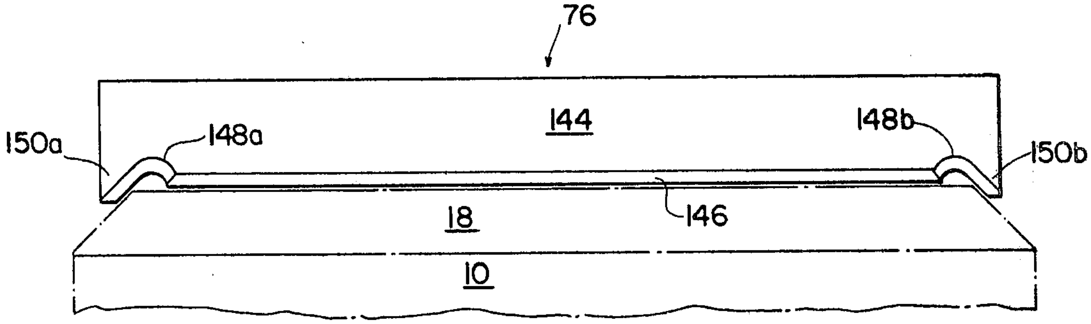
FIG. 15
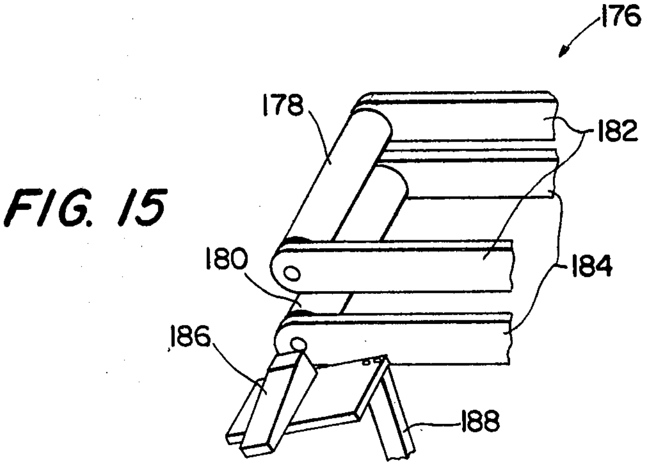
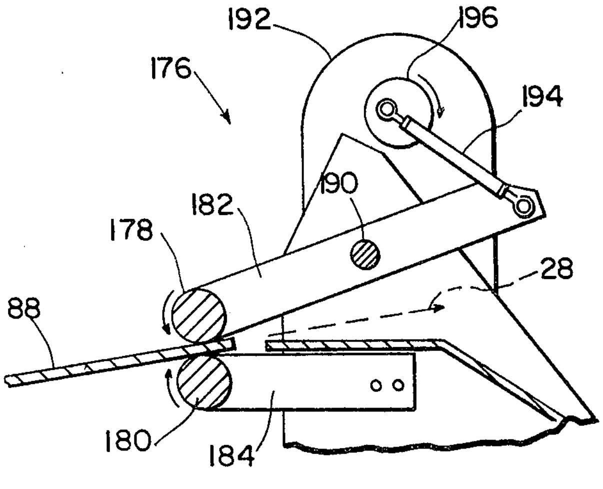
FIG. 16

FOLDING OF FLAT SHEET TO EXACT INTERIOR HEIGHT

FIELD OF THE INVENTION

This invention relates to a folding method and apparatus in which tangential bending and press bending are used to fold a flat sheet.

BACKGROUND OF THE INVENTION

The folding of flat sheets of a material to produce a container, such as a box, jacket or the like, has long been known in the prior art. In order to form the container by folding the flat sheet, in most cases the fold has been accomplished by tangential bending. Tangential bending occurs when a free portion of the flat sheet to be bent is progressively wrapped around the edge of a shim. In this manner, the portion of the flat sheet extending beyond the shim is approximately tangent to the edge as the fold is made.

While tangential bending has proven satisfactory in producing a wide variety of different containers, tangential bending and other prior art types of bending have not proven satisfactory for certain uses. In particular, where tangential bending is used to produce a flat jacket to contain a magnetic disk, particularly a floppy disk, the interior of the jacket tends to press down and damage the magnetic disk. This problem is due to the fact that tangential bending produces essentially a two-dimensional, wedge-shaped fold. The magnetic disk then becomes pressed between the two surfaces in the wedge.

SUMMARY OF THE INVENTION

In accordance with the present invention, a folding method and apparatus is provided which folds a flat sheet so that an exact interior height adjacent the fold is provided. The folding of the flat sheet is accomplished in two steps after a shim with a rounded edge is located on the sheet. In the first step, the portion of the sheet extending beyond the shim is tangentially folded to approximately 90°. Next, a die having a facing edge which mates with the folding edge of the shim is pushed onto the shim to finish bending the portion of the flat sheet extending beyond the shim to approximately 180°. By use of this die, an exact interior height adjacent the fold is provided. In a preferred embodiment, an extended portion of the die above the facing edge is used to accomplish the initial tangential bending.

According to another preferred embodiment of the invention, a method and apparatus for forming a flat jacket having an exact interior height is provided. In this embodiment, a flat sheet having side wings is folded around a shim which is located on the flat sheet. The shim has a number of rounded folding edges corresponding to the number of folds which need to be made to form the jacket. The flat sheet is then folded using the two step process mentioned above along a transverse line so that a substantial portion of the flat sheet overlaps the remaining portion of the flat sheet. The side wings provided on the flat sheet are then folded, again using the two step process on top of the prior folded portion. The side wings are then attached to the substantial portion to complete formation of the jacket. With this embodiment, a flat jacket having an exact interior height is provided. Preferably, the flat sheet is made of a plastics material and the dies are heated so that the folded portions of the sheet are also heated. This heating helps the folded portions to retain their folded shape.

In still another preferred embodiment of the present invention, an apparatus is provided for forming a plurality of flat jackets using a plurality of forming devices. In this embodiment, a loading device is provided for feeding each forming device with a flat sheet to be folded. In addition, a removing device is provided for removing the formed jacket from the shim. Preferably, the forming devices are located on a turntable which is indexed and stopped to align each forming device sequentially with the loading device and the removing device. The various dies provided with the forming devices have cam followers which cooperate with cam tracks located around the turntable.

It is an object of the present invention to produce a 180° fold in a flat sheet wherein the folded portion is substantially rounded and having the same interior height as the shim about which the sheet is folded.

It is a further object of the present invention to produce a flat jacket for containing a magnetic disk in which the folded portions of the jacket have an exact interior height such that the magnetic disk does not become wedged or caught in the folded portions and damaged. In addition, the magnetic disk is easily removed from the flat jacket because the periphery of the disk is not caught by the folded portions of the jacket.

Other objects, features and advantages of the present invention are stated in or apparent from the detailed description of presently preferred embodiments of the invention found hereinbelow.

BRIEF DESCRIPTION OF THE DRAWINGS

FIG. 13 is a top plan view of the locator depicted in FIG. 10 which locates the flat sheet on the forming device.

FIG. 15 is a schematic partial perspective view of the flat jacket removing device of the present invention.

FIG. 16 is a schematic cross-sectional elevational view of the removing device depicted in FIG. 15.

DETAILED DESCRIPTION OF THE PREFERRED EMBODIMENTS

Figure 1:
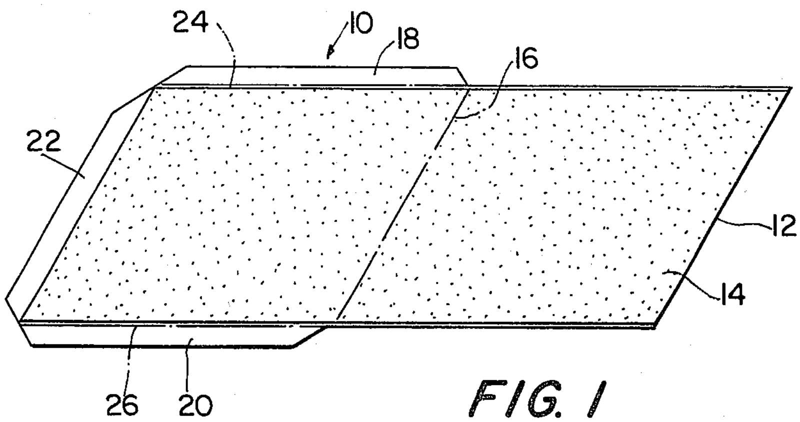
FIG. 1 is a perspective view of a flat sheet which is folded according to the present invention to produce a flat jacket.

With reference now to the drawings in which like numerals represent like elements throughout the several views, a flat sheet 10 which is folded to form a flat jacket for a magnetic disk or the like is depicted in FIG. 1. Preferably, flat sheet 10 is made of a plastics material such as PVC and includes a generally rectangular shaped portion 12 which is covered by a thin fabric layer 14 which is attached thereto. Rectangular portion 12 is divided into two approximately equal square portions by dotted line 16. Located on one side of dotted line 16 on rectangular portion 12 are lateral wing portions 18 and 20 and an end wing portion 22 which are integral with rectangular portion 12. Dotted lines 24 and 26 mark the imaginary boundary between lateral wing portions 18 and 20, respectively, and rectangular portion 12.

Figure 2:
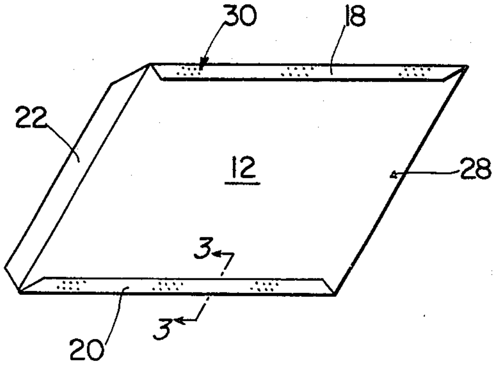
FIG. 2 is a perspective view of a flat sheet depicted in FIG. 1 which has been folded into a flat jacket.
Figure 3:
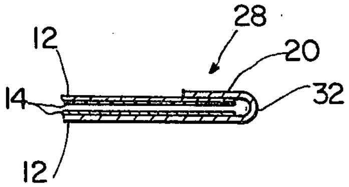
FIG. 3 is a cross-sectional elevational view of the side of the flat jacket depicted in FIG. 2 taken along the line 3—3.

Before describing how flat sheet 10 is precisely folded by the present invention to produce a flat jacket 28 as depicted in FIG. 2, it will be helpful to first describe the folds which are made in flat sheet 10 to produce flat jacket 28. Therefore, with reference to FIGS. 2 and 3, a finished flat jacket 28 is depicted which has been formed according to the present invention. In order to form flat jacket 28, rectangular portion 12 is first folded in half along dotted line 16. Next, lateral wing portions 18 and 20 are folded along respective dotted lines 24 and 26 on top of the folded portion of rectangular portion 12. Lateral wing portions 18 and 20 are then attached as by fusing at points 30 to the underlying rectangular portion 12. As shown in FIG. 3, where the bending of lateral wing portion 20 is accomplished according to the present invention, the bent portion 32 of lateral wing 20 has a rounded cross section. Therefore, after lateral wing portion 20 is attached to the upper half of rectangular portion 12, the interior height or spacing between the two halves of rectangular portion 12 remains the same all the way to bent portion 32. As discussed above, prior art bending methods produced a wedge-shaped cross section at bent portion 32 which was undesirable.

Figure 4:
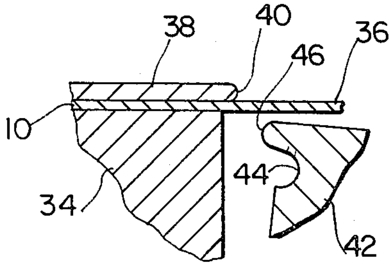
FIG. 4 is a cross-sectional elevational view of the folding elements and a flat sheet prior to folding according to the present invention.
Figure 5:
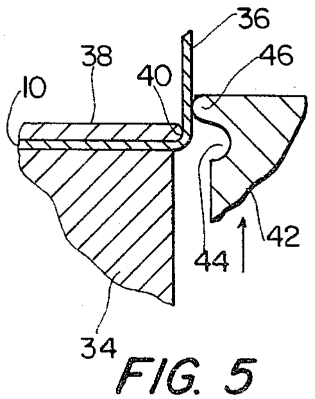
FIG. 5 is a cross-sectional elevational view of the folding elements and flat sheet after the first step in folding.
Figure 6:
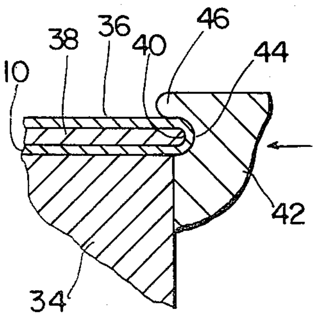
FIG. 6 is a cross-sectional elevational view of the folding elements and flat sheet after the second step of folding.

The manner in which flat sheet 10 is folded is depicted in FIGS. 4, 5 and 6. As shown in FIG. 4, flat sheet 10 is initially located on a bottom plate 34 with an extended portion 36 of flat sheet 10 projecting horizontally beyond bottom plate 24. Pressing on top of flat sheet 10 is a shim 38 which has a rounded folding edge 40 which also extends slightly beyond bottom plate 34. Located below extended portion 36 of flat sheet 10 is a die 42. Die 42 includes a facing edge 44 which has a mating shape with respect to folding edge 40. Located slightly above facing edge 44 is an extended nose 46.

The first step in folding extended portion 36 is depicted in FIG. 5. As shown in FIG. 5 by the dotted arrow, die 42 has moved vertically so that extended nose 46 contacted extended portion 36. The vertical motion of die 42 and extended nose 46 causes extended portion 36 to be folded around folding edge 40 of shim 36 to approximately a vertical position. This type of bending is the tangential bending which was described above. With the present invention, this tangential bending is only used to bend the extended portion 36 approximately 90°.

The second and last step in completing the fold of extended portion 36 is depicted in FIG. 6. In this step, die 42 has moved as shown by the dotted arrow so that facing edge 44 is pressed against folding edge 40 of shim 38. As facing edge 44 presses against folding edge 40, extended portion 36 is trapped therebetween and folded from the vertical position to the horizontal position as shown. This action results in pressure bending as facing edge 44 presses extended portion 36 about folding edge 40. It should be noted that this bending differs significantly from the tangential bending used in the first step. As a result of this pressure bending, the bent portion of extended portion 36 retains the rounded curvature of folding edge 40 and the thickness of shim 38. Therefore, when shim 38 and die 42 are removed, the interior height between extended portion 36 and flat sheet 10 remains the same as the thickness of shim 38 all the way to the rounded bent portion as desired.

Figure 7:
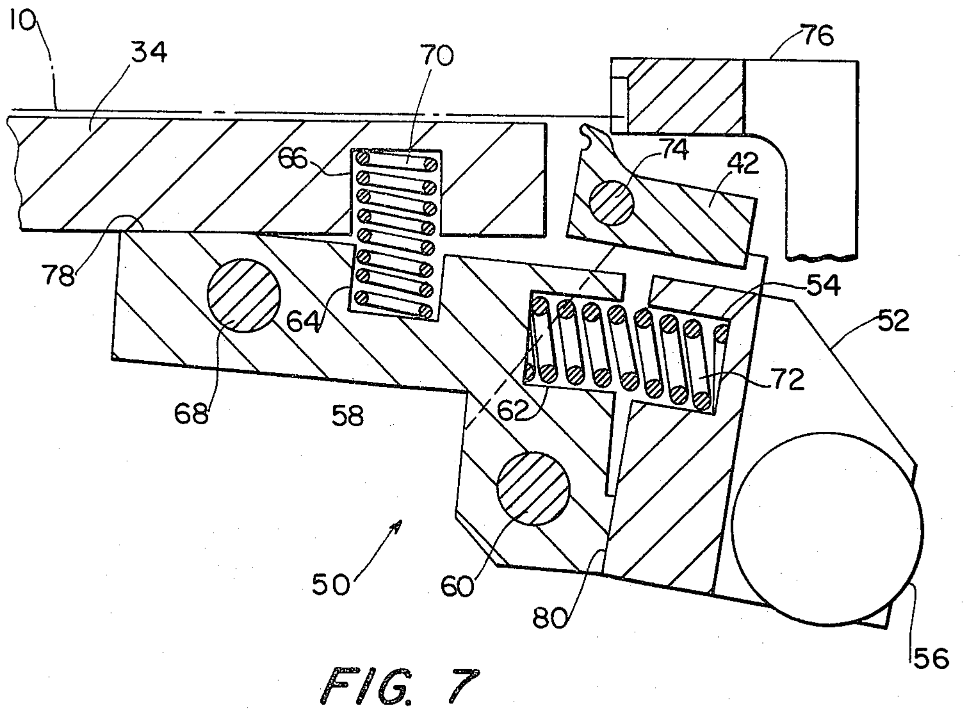
FIG. 7 is a cross-sectional elevational view of an apparatus for producing the two step folding process in the rest position.

A mechanism 50 which accomplishes a two step movement to provide the two step bending movement of die 42 discussed above is shown in FIGS. 7, 8 and 9. Mechanism 50 is depicted in FIG. 7 in the rest position where die 42 is below the top of bottom plate 34 corresponding to the position of die 42 shown in FIG. 4. Die 42 is rigidly attached to a bracket 52 which has a recess 54 therein. Extending slightly below bracket 52 is a cam follower 56 which is rotatably mounted to bracket 52. Bracket 52 is rotatably attached to a bracket 58 by a pin 60. Bracket 58 also includes a recess 62 which is located opposite to recess 54 of bracket 52, and a second recess 64 which is opposite to a recess 66 located in top plate 34. Bracket 58 is itself pivotably mounted to bottom plate 34 by a pin 68. A light spring 70 is located in recesses 66 and 64 while a heavy spring 72 is located in recesses 54 and 62. With this embodiment of the present invention, die 42 includes a pencil heating element 74 along the length thereof. Where mechanism 50 is used to fold the side wings of the flat sheet, a sheet locator 76 is positioned above die 42 adjacent bottom plate 34 to locate the sheet precisely on top of bottom plate 34. Sheet locator 76 is omitted from mechanism 50 where mechanism 50 is used to fold the rectangular portion 12, as shown in FIG. 1, in half.

Both light spring 70 and heavy spring 72 are under compression as depicted in FIG. 7. This causes bracket 58 to be rotated about pin 68 until flat surface 78 of bracket 58 contacts the mating flat surface of bottom plate 34. In a similar manner, heavy spring 72 caused bracket 52 to pivot about pin 60 until the flat surface 80 of bracket 58 is contacted by a mating flat surface of bracket 52. With mechanism 50 in this rest position, flat sheet 10 and shim 38 can be located on bottom plate 34 as shown in FIG. 4. It should be noted that in FIGS. 7, 8 and 9, flat sheet 10 has been represented by a broken line and shim 38 has been omitted for clarity.

Figure 8:
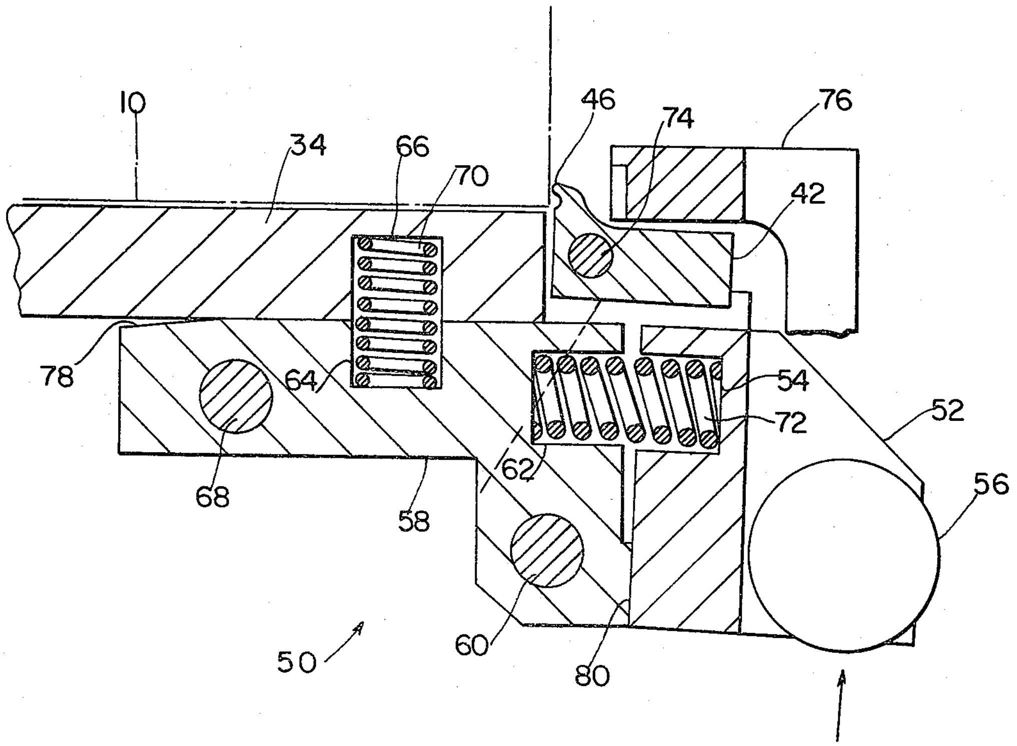
FIG. 8 is a cross-sectional elevational view of the apparatus disclosed in FIG. 7 after the first step of folding has been performed.

In FIG. 8, mechanism 50 is depicted after the first step of bending of flat sheet 10 depicted in FIG. 5 has occurred. The vertical movement of extended nose 46 of die 42 occurs when cam follower 56 is pushed upwardly slightly as shown by the dotted arrow by an associated cam track (not shown). As cam follower 56 is pushed upwardly, a compressive force is applied to both light spring 70 and heavy spring 72. However, due to the greater resiliency or lesser strength of light spring 70, light spring 70 is compressed further to absorb this compressive force. As light spring 70 is compressed further, bracket 58 is pivoted about pin 68 until bracket 58 contacts the bottom of bottom plate 34. In this position, it should be noted that flat surface 78 has separated from the bottom of bottom plate 34. As bracket 58 moved about pin 68, bracket 52 which is attached thereto moved as well. The movement of bracket 52 caused extended nose 46 of die 42 to bend flat sheet 10 to a vertical position, the first step in bending as shown in FIG. 5 as well. During this first step of bending, it should also be noted that the compressive force of heavy spring 72 has maintained the flat surface 80 in contact with the mating surface of bracket 52.

Figure 9:
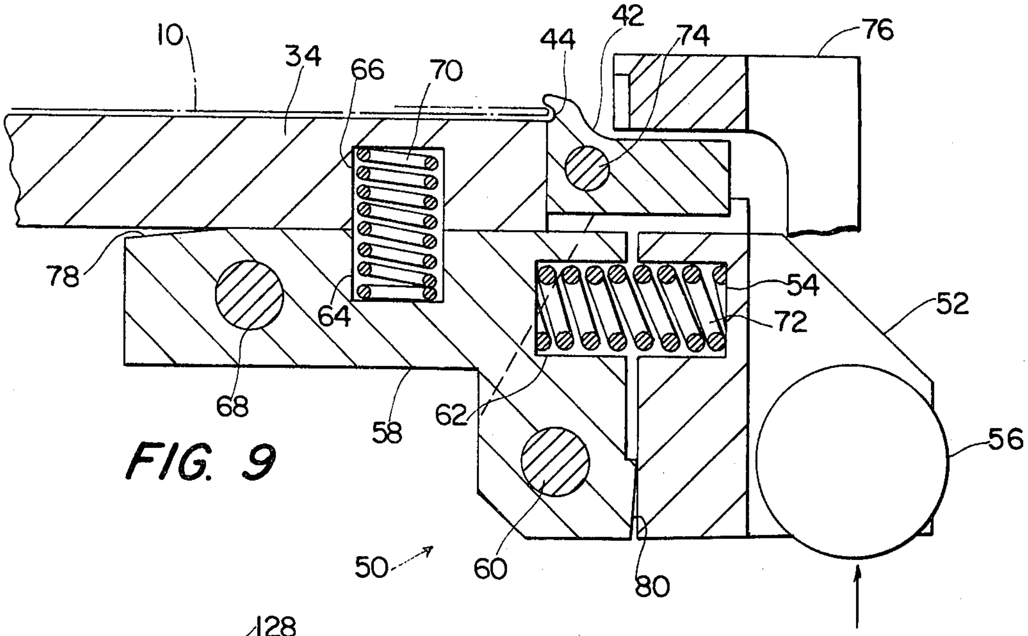
FIG. 9 is a cross-sectional elevational view of the apparatus depicted in FIG. 7 after the second step of folding has been performed.

In FIG. 9, mechanism 50 is depicted after the second step of bending of flat sheet 10 as shown in FIG. 6 has occured. The essentially horizontal movement of facing edge 44 of die 42 being pushed onto shim 38 occurs when cam follower 56 is further pushed upwardly, as shown by the dotted arrow, by the associated cam track (not shown). As cam follower 56 is pushed further upwardly, a further compressive force is applied only to heavy spring 72 because light spring 70 cannot be compressed further due to the fact that bracket 58 is in contact with the bottom of bottom plate 34. As heavy spring 72 compresses, bracket 52 pivots about pin 60 causing facing edge 44 of die 42 to move onto shim 38 and to complete the fold of flat sheet 10 on top of itself. It should be noted that as bracket 42 pivots about pin 60, flat surface 80 is separated from the mating surface of bracket 52. The movement of bracket 52 is stopped precisely with facing edge 44 around shim 38 as the mating surface of die 42 below facing edge 44 contacts the flat side surface of bottom plate 34. It should also be noted that pencil heating element 74 causes facing edge 44 of die 42 to be heated significantly. Where flat sheet 10 is made of a plastics material, as facing edge 44 surrounds shim 38, heat is transferred to flat sheet 10. This heat causes flat sheet 10 to bend more easily and to lose the memory in the plastic of being flat and instead to generate a new memory in the plastic of being bent. This new memory also helps to ensure that the interior height between the bent portions of flat sheet 10 is exact and that the rounded bent portion is retained.

After the bending and heatng of flat sheet 10 is completed, the cam track (not shown) which engages cam follower 56 allows cam follower 56 to make two quick downward movements. During the first downward movement, heavy spring 72 causes bracket 52 to move from the position shown in FIG. 9 to the position shown in FIG. 8. In this manner, die 42 disengages flat sheet 10. During the next downward movement of cam follower 56, bracket 58 is pivoted by light spring 70 to assume the rest position shown in FIG. 7 with flat surface 78 pressed against the bottom of bottom plate 34.

Figure 10:
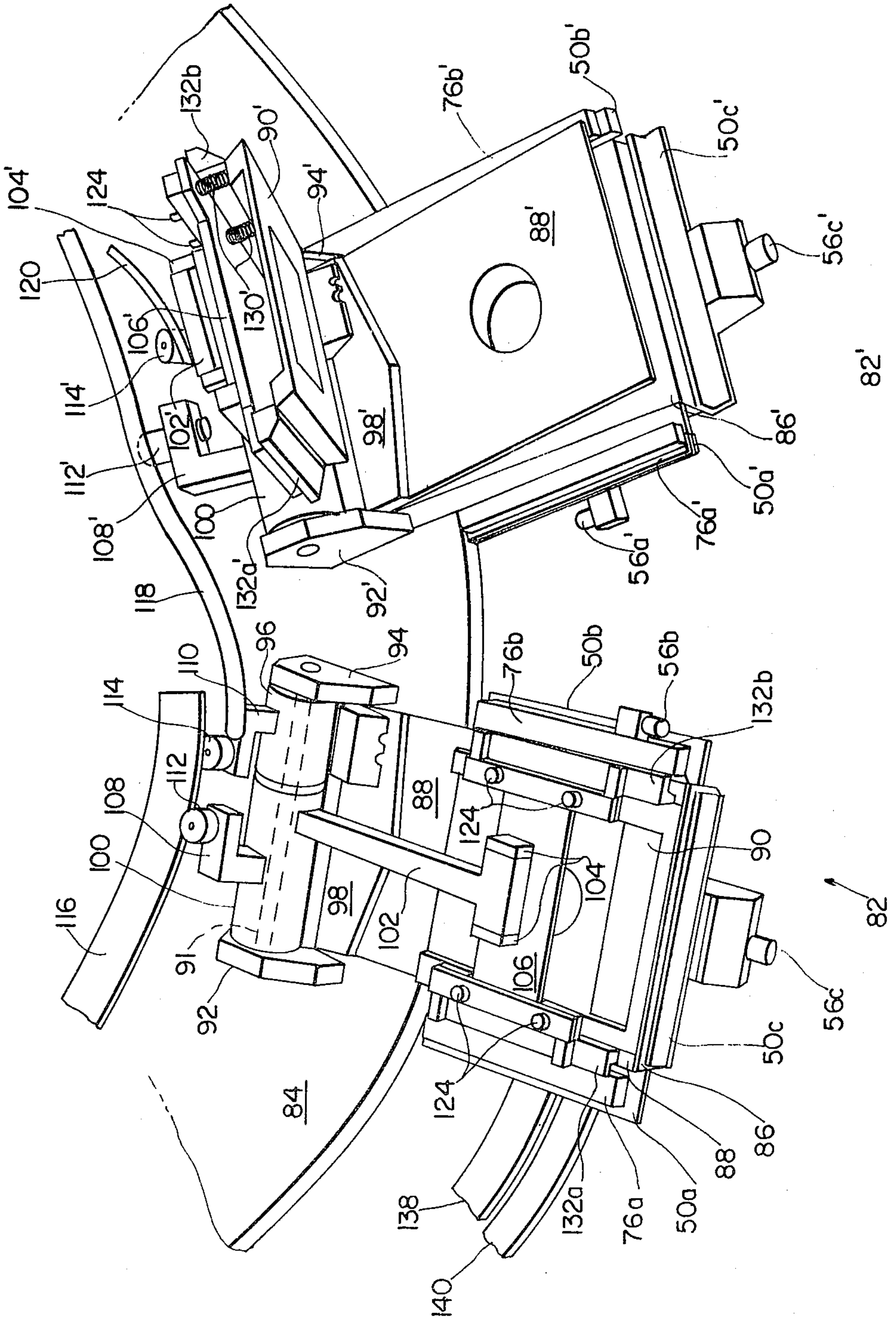
FIG. 10 is a schematic perspective view of two forming devices mounted on a turntable according to the present invention.

Depicted in FIG. 10 are two forming devices 82 and 82' which are securely attached to a turntable 84. Forming devices 82 and 82' are identical, but are shown in different operating positions. Because forming devices 82 and 82' are identical, forming device 82 will described in detail and the corresponding elements in forming device 82' will be identified with the same number denoted with a prime. Forming device 82 includes a rectangularly shaped bottom plate 86 with a similarly shaped shim 88 directly above. Shim 88 has a thickness equal to the desired thickness of the flat jacket to be formed and includes three straight folding edges around the periphery which extends slightly beyond bottom plate 86. Located above shim 88 is a smaller top plate 90. Bottom plate 86 is securely attached to turntable 84 whereas shim 88 and top plate 90 are pivotably attached relative to turntable 84. Both shim 88 and top plate 90 are pivotably attached to a shaft 91 mounted between upstanding brackets 92 and 94. The pivotal mounting of shim 88 includes a collar 96 which is mounted on shaft 91 and which is securely attached to a mounting structure 98 to which shim 88 is attached. Top plate 90 is similarly mounted on shaft 91 by a separate collar 100 adjacent to collar 96. Collar 100 is attached to top plate 90 by an arm 102 which is pivotably received on a mounting bracket 104. Mounting bracket 104 is attached to a frame 106 to which top plate 90 is spring mounted as will be discussed subsequently. Both collar 96 and collar 100 have an upstanding bracket 108 and 110, respectively, to which a cam follower 112 and 114, respectively, is attached. It should be noted that cam follower 112 is located further away from shaft 91 than cam follower 114. Mounted stationary with respect to turntable 84 are cam tracks 116, 118, and 120. As shown, cam follower 112 engages cam track 116 and subsequently cam track 118, while cam follower 114 engages the lower mounted cam track 120 for purposes to be described subsequently.

Figure 11:
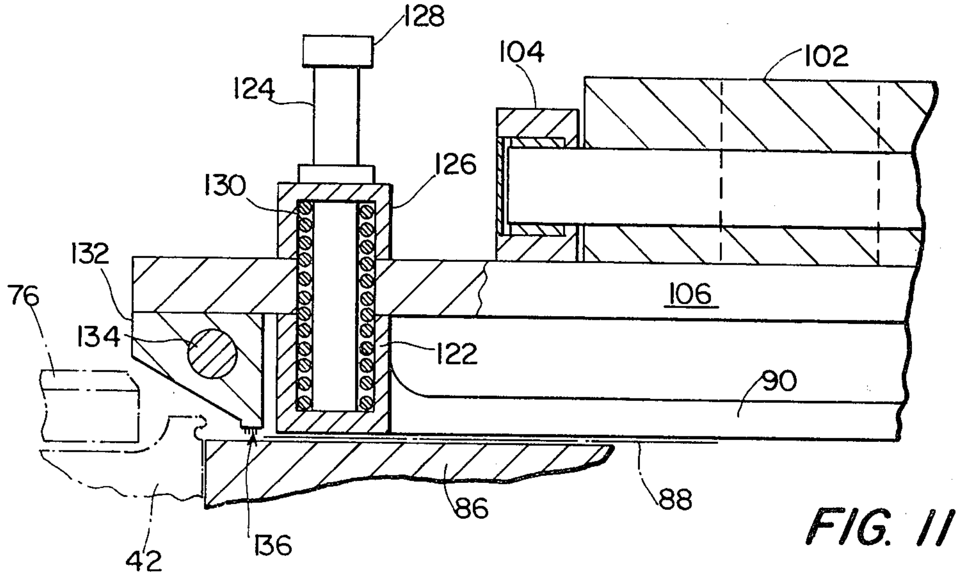
FIG. 11 is a partial cross-sectional elevational view of the heat stakes of the present invention in the lower operating position.
Figure 12:
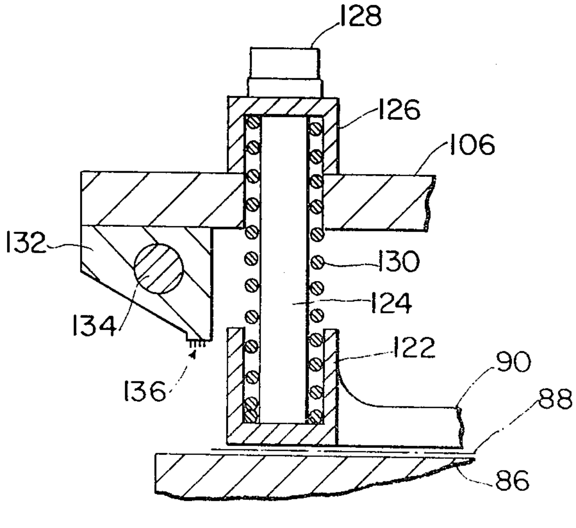
FIG. 12 is a partial cross-sectional elevational view of the heat stakes depicted in FIG. 11 in the upper rest position.

With reference now also to FIGS. 11 and 12, the spring mounting of top plate 90 to frame 106 is shown in more detail. Attached in the center of a recess 122 contained in top plate 90 is a post 124. Post 124 extends through frame 106 and through a recess bracket 126 which is attached to frame 106. At the top of post 124 is a head 128. Located about the portion of post 124 contained between recess 122 and recess bracket 126 is a spring 130 under compression. Frame 106 extends horizontally beyond shim 88 and has a downwardly depending member 132 attached securely thereto. Member 132 contains a heating element 134 and a plurality of sets of tiny heat stakes 136 at the lowermost end thereof which are disposed above top plate 86.

Top plate 90 is shown resting firmly on shim 88 and bottom plate 86 in both FIGS. 11 and 12. However, in FIG. 12 only a slight downward pressure is exerted by arm 102. Thus, top plate 90 rests firmly against shim 88 in FIG. 12 but spring 130 causes frame 106 to be spaced from top plate 90 with head 128 of post 124 engaging the top of recess bracket 126. When a greater force is exerted on arm 102 sufficient to overcome the upwardly directed compressive force of spring 130, frame 106 moves downwardly to engage the top of recess 122. As this occurs, heat stakes 136 which are heated by heating element 134 are also lowered and press against the flat sheet (not shown) which is located around shim 88. As shown in FIG. 2, lateral wing portions 18 and 20 are attached to rectangular portion 12 at a series of fuse points 30. These points 30 are created by heat stakes 136 when frame 106 is moved downwardly to the position shown in FIG. 11 as will be discussed subsequently. As shown in FIG. 10, top plate 90 is mounted to frame 106 by four posts 124 and associated springs 130. In addition, frame 106 has a downwardly depending member **132*a* similar to member 132 shown in FIG. 11 on one side and a downwardly depending member 132*b* located on the other side which is also similar to member 132** but a mirror image thereof.

Also depicted in FIG. 10 is a mechanism 50b which is attached to bottom plate 86. Mechanism 50b is similar to mechanism 50 depicted in FIGS. 7 to 9. Located on the other side of bottom plate 86 is a mechanism 50a which is a mirror image of mechanism 50b. Mechanisms 50a and 50b include cam followers 56a and 56b, respectively. It should be noted that cam followers 56a and 56b extend from mechanisms 50a and 50b in opposite directions. Thus, cam followers 56a and 56b engage respective ones of cam tracks 138 and 140, for purposes to be described subsequently. Attached to the front of bottom plate 86 is another mechanism 50c. Mechanism 50c has a cam follower 56c which engages a suitable cam track 142.

As shown in FIG. 10, both mechanisms 50a and 50b have a sheet locator 76a and 76b, respectively, adjacent thereto. A sheet locator 76 similar to locator 76a and 76b is shown in more detail in FIGS. 7 to 9 and 13. Referring to FIG. 13 especially, locator 76 includes a flat bar 144 with a bevelled edge 146. Located at each end of bar 144 are notches 148a and 148b. Notches 148a and 148b are spaced just inwardly from extended ends 150a and 150b below bevelled edge 146. Referring again to FIG. 10, locators 76a and 76b are spaced from one another so that side wings 18 and 20 are just located between the appropriate extended ends 150a and 150b of each sheet locator 76a and 76b. It should be noted that mechanism 50c does not have a locator associated therewith.

Figure 14:
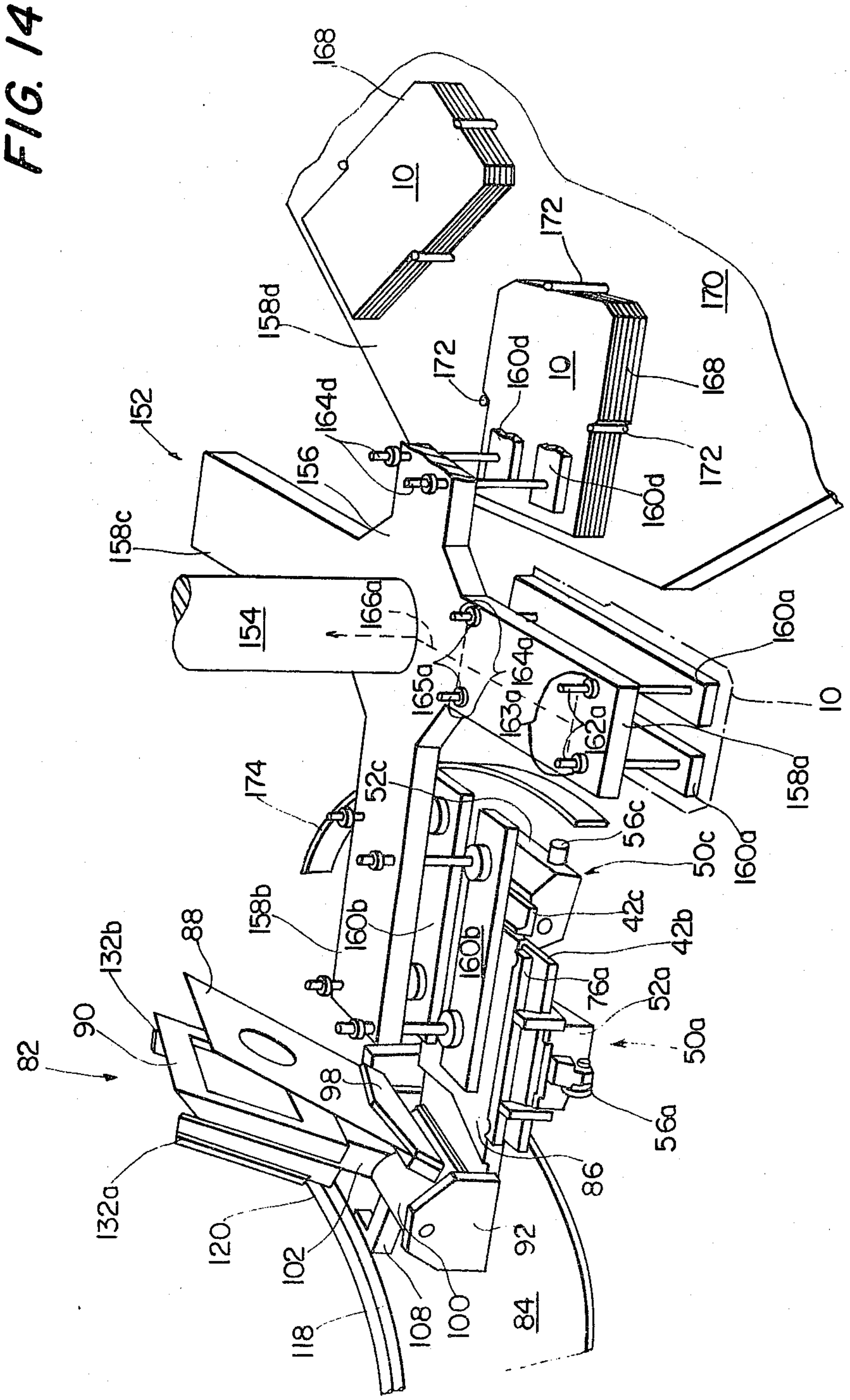
FIG. 14 is a schematic perspective view of the flat sheet loading apparatus of the present invention.

A loading device 152 for loading sheets 10 onto the top plate 86 of a forming device 82 is depicted in FIG. 14. Loading device 152 includes a stationary column 154 on which a base 156 is movably mounted. Base 156 is mounted for both up and down movement with respect to column 154 and for indexed 90° rotational movements around column 154. Extending from base 156 at 90° intervals are arms 158a, 158b, 158c, and 158d. As arms 158a to 158d are identical in nature, only arm 158a will be described in detail. Located below arm 158a are two elongate feet 160a. Each foot 160a is attached to pipes 162a and 164a which are slidably received in arm 158a. Pipes 162a and 164a have stop collars 163a and 165a, respectively, so that foot 160a hangs from arm 158a. The bottom portion of each foot 160a is provided with a number of suction holes which are well known in the art. Each suction hole is fluidly connected by either pipe 162a or pipe 164a to a vacuum line 166a which is shown schematically and which is connected to a suitable vacuum source (not shown). In FIG. 14, loading device 152 is shown after picking up a single flat sheet 10 from one of a plurality of stacks 168 of flat sheets 10 located on a turntable 170. Turntable 170 has mounting posts 172 between which stacks 168 are located. As one stack 168 located on turntable 170 is depleted, a new stack 168 is rotated into place by turntable 170 by a suitable mechanism.

Loading device 152 is used to deliver a single sheet 10 from stack 168 to the presented forming device 82 mounted on turntable 84. In order to pick up a flat sheet 10 from stack 168, base 156 is lowered relative to column 154 until pipes 162d and 164d slide up in arm 158d as feet 160d engage the top sheet 10 of stack 168. Then, the suction holes at the bottom of feet 160d hold onto the top flat sheet 10. Base 156 is then raised until stop collars 163d and 165d have engaged the top of arm 158d. With flat sheet 10 then attached to the bottom of feet 160d by suction, base 156 is rotated 90°. At the same time that base 156 is lowered to pick up a sheet 10 from stack 168 with feet 160d, feet 160b which have already picked up a flat sheet (not shown) are similarly lowered toward bottom plate 86. As feet 160d pick up a flat sheet 10 from stack 168, the suction to feet 160b is turned off so that the flat sheet drops onto bottom plate 86. The flat sheet dropped by feet 160b onto bottom plate 86 is aligned on bottom plate 86 by locators 76a and 76b as described above. It should be noted that rectangular portion 12 extending horizontally away from bottom plate 86 rests on a horizontally curved guide 174 so that flat sheet 10 is not flexed. Base 156 is then rotated 90° so that feet 160a drop the attached flat sheet 10 onto a newly presented forming device 82 while the feet associated with arm 158c pick up a new flat sheet 10 from stack 168. It should also be noted that both top plate 90 and shim 88 have been raised out of the way of arm 158b by cam tracks 118 and 120 and the associated cam followers of top plate 90 and shim 88.

After forming flat sheet 10 into flat jacket 28 on shim 88, flat jacket 28 must be removed from shim 88. A removing device 176 is depicted in FIGS. 15 and 16 which is suitable for use with forming devices 82 located on turntable 84. Removing device 176 includes two rollers 178 and 180 which rotate in opposite directions as shown by the arrows. Rollers 178 and 180 are mounted by suitable mounting arms 182 and 184, respectively, which also contain driving connections for rotating rollers 178 and 180. Located on the leading side of roller 180 is a wedge-shaped guide 186 which is located there by a suitable support 188. Wedge-shaped guide 186 helps to lead shim 88 to a position in between rollers 178 and 180.

As shown in more detail in FIG. 16, mounting arms 182 for roller 178 are mounted for pivotal movement about a pin 190 which is attached to a housing 192. The distal end of mounting arm 182 is swingably attached to one end of a linkage 194. The other end of linkage 194 is eccentrically attached to a rotating disk 196. As disk 196 rotates, linkage 194 causes the distal end of mounting arm 182 to move up and down which in turn causes roller 178 located at the other end of mounting arm 182 to oppositely move down and up. Mounting arm 184 is also attached securely to housing 192.

The rotation of disk 196 is synchronized with the rotation of turntable 84 so that roller 178 is raised as shim 88, on which flat jacket 12 has been formed, rides up on wedge-shaped guide 186 and between rollers 178 and 180. Then, as roller 178 travels downwardly, both rollers 178 and 180 contact flat jacket 28 on shim 88. This causes flat jacket 28 to be forcefully conveyed off of shim 88 and onto a chute 198 which leads to stacking equipment or the like. Turntable 84 is indexed again when disk 196 is rotated sufficiently to raise roller 178 so that shim 88 moves freely with turntable 84 from between spaced rollers 178 and 180.

The operation of an automated apparatus for forming a plurality of flat jackets from flat sheets made of plastic where the apparatus is provided with a turntable 84 on which a plurality of forming devices 82 are located is as follows. Initially, turntable 84 is rotated and indexed to a position where a forming device 82 is located opposite loading device 152. With shim 88 and top plate 90 raised above arm 158b as shown in FIG. 14, base 156 is lowered and the vacuum to feet 160b is cut off so that a flat sheet 10 is dropped onto bottom plate 86. Flat sheet 10 is precisely located on bottom plate 86 by locators 76a and 76b as side wings 18 and 20 of flat sheet 10 engage the respective nose portions 150a and 150b of locators 76*a* and 76*b*. As flat sheet 10 is dropped onto bottom plate 86 and located precisely, rectangular portion 12 of flat sheet 10 is supported on curved guide 174. Base 156 is then raised and turntable 84 is rotated to index a new forming means 82 opposite loading device 152. As forming device 82 is rotated away from loading device 152, base 156 is rotated 90° so that feet **160*a* of arm 158*a* are rotated into position to drop a new flat sheet 10 onto the newly arrived forming device 82. It should be noted that as base 156 was lowered to drop a flat sheet onto forming device 82 from feet 160*b*, feet 160*d* were similarly lowered and picked up a new flat sheet 10 from stack 168 with the suction at the bottom of feet 160*d*. In this manner, as each newly presented forming device 82 is rotated and indexed into position opposite loading device 152, a new flat sheet is dropped onto bottom plate 86 while a new flat sheet 10 is being picked up by the appropriate feet from stack 168. Thus, loading device 152 continually supplies a new flat sheet as each new forming device is indexed opposite loading device 152. When stack 168 is depleted of flat sheets 10, turntable 170 is automatically rotated and indexed to present a new stack 168 of flat sheet 10 to the feet 160** presented thereto.

After flat sheet 10 has been precisely located on bottom plate 86, forming device 82 is rotated away from loading device 152. As this occurs, first shim 88 and then top plate 90 are lowered onto flat sheet 10. The lowering of shim 88 and top plate 90 is controlled by the associated cam followers 114 and 112, respectively, which follow cam tracks 120 and 118, respectively. Next, cam follower 112 causes top plate 90 to positively press against shim 88 as depicted in FIG. 12. In this position, forming means **50*c* performs the first step of the two step folding by folding flat sheet 10 approximately 90° as depicted in FIG. 5. This first step of folding is caused by cam follower 56*c* engaging cam track 142. Before the second step of folding can be performed by die 42*c*, rectangular portion 12 which now extends vertically above top plate 90 must be located underneath of top plate 90. To accomplish this, top plate 90 is raised by associated cam follower 112 engaging cam track 118. Then, as turntable 84 is indexed further, an inwardly curved guide similar to guide 174 causes the top of rectangular portion 12 to be bent over shim 88. The second step of forming with die 42*c* then occurs as cam follower 56*c* engages a higher portion of cam track 142. This causes rectangular portion 12 to be folded flat on top of shim 88 as a precisely formed fold of flat sheet 10 occurs along line 16. This is the complete fold depicted in FIG. 6. Further rotation of turntable 84 causes cam follower 56*c* to follow a lowered cam track 142 so that the two step movement of die 42*c* depicted in FIGS. 7 to 9 is reversed. At the same time, cam follower 112 causes top plate 90 to be positively pressed down on extended portion 12 which is on top of shim 88 so that flat sheet 10 is secured around shim 88. This securing of flat sheet is 10 on shim 88 is depicted in FIG. 12**.

As turntable 84 rotates further, side wings 18 and 20 of flat sheet 10 are folded aobut shim 88. This occurs as cam follower **56*a* of mechanism 50*a* contacts a rising cam track 138 and cam follower 56*b* of mechanism 50*b* similarly contacts a rising cam track 140. Again, the two step folding motion of dies 42*a* and 42*b* are depicted in FIGS. 7 to 9 as the precise folding of flat sheet 10 depicted in FIGS. 4 to 6 is accomplished. With dies 42*a* and 42*b* held in place against shim 88, cam follower 112 of top plate 90 engages cam track 116 which pushes cam follower 112 toward top plate 90. The force exerted on cam follower 112 causes frame 106 to be pressed down against the force of each spring 130 and into contact with each recess 122 as shown in FIG. 11. In this position, the sets of heat stakes 136 press downward. Further rotation of turntable 84 causes cam follower 112 to leave cam track 116 so that mechanism 132*a* and 132*b* are lifted off of side wings 20 and 18, respectively, by springs 130 and return to the position shown in FIG. 12. Still further rotation of turntable 84 causes cam follower 112 to engage cam track 118 causing top plate 90 to be rotated to a nearly upright position such as shown by top plate 90′ in FIG. 10. While top plate 90 is being withdrawn from shim 88, cam followers 56*a* and 56*b* engage lowered portions of cam tracks 138 and 140, respectively, so that the two step motion of dies 42*a* and 42*b* shown in FIGS. 7 to 9 is reversed. At this point, the forming of flat jacket 28** is completed.

In order to remove flat jacket 28 from shim 88, turntable 84 is further rotated causing cam follower 114 to engage cam track 120. This causes shim 88 to raise up from bottom plate 86, as shown by shim 88′ in FIG. 10. Still further rotation of turntable 84 causes shim 88 to rise to a position so that the leading edge of shim 88 engages wedge-shaped guide 186. Turntable 84 is then rotated and indexed to position shim 88 between rollers 178 and 180 of removing device 176. At the same time, removing device 176 has also been operated so that roller 178 is spaced from roller 180 by the action of rotating disk 196. Once shim 88 is located between separated rollers 178 and 180, rotating disk 196 rotates causing roller 178 to move downwardly and press shim 88 between rollers 178 and 180. Because rollers 178 and 180 are turning in opposite directions, flat jacket 28 contained on shim 88 is immediately conveyed off of shim 88 and onto an appropriate chute. Roller 178 is then raised again off of shim 88.

A further rotation of turntable 84 causes cam follower 114 to engage cam track 120 so that shim 88 is raised fully to the position shown in FIG. 14. Finally, turntable 84 is rotated and indexed to return forming device 82 to a position opposite loading device 152 so that a new flat sheet 10 can be received. In this manner, forming device 82 has completed a cycle of operation which can be continuously repeated.

It should be appreciated that turntable 84 advantageously has a number of forming devices 82 mounted thereon. In this manner, each forming device 82 is cyclically operated so that a plurality of flat jackets 28 are made. Because a number of forming devices 82 are provided, turntable 84 is continuously indexed and stopped just long enough for a new sheet 10 to be dropped onto bottom plate 86 while at the same time a completed flat jacket 28 is removed from shim 88 of another forming device 82. If a loading device 152 and a removing device 176 could be synchronized with the rotation of turntable 84, it would also be possible to have turntable 84 turn at a constant velocity without stopping.

As noted above, by providing die 42 with a pencil heating element 74, a more permanent fold in a flat sheet 10 made of plastics material is achieved. It is contemplated that pencil heating element 74 is electrically heated by appropriate wires. These wires have been omitted from the drawings for the sake of clarity. Similarly, the heating elements 134 of mechanism 132 can be electrically heated by wires which also have been omitted from the drawings.

Although the invention has been described in detail with respect to exemplary embodiments thereof, it will be understood by those of ordinary skill in the art that variations and modifications may be affected within the scope and spirit of the invention.

What is claimed is:

1. An apparatus for making a fold in a flat sheet with the folded sheet having an exact interior height comprising:
   a flat shim with a folding edge, said folding edge being rounded in vertical cross section and having a thickness equal to the desired interior height;
   a position means for positioning said shim on the flat sheet with said folding edge adjacent to the place where the fold is made;
   a bend means for tangentially bending a portion of the flat sheet approximately 90° on said folding edge;
   a die having a facing edge, said facing edge having a mating shape with respect to said folding edge; and
   a push means for pushing said facing edge of said die against said folding edge of said shim such that the 90° folded portion of the sheet is further folded to approximately 180° and an exact interior height adjacent the fold is provided.

2. An apparatus for making a fold as claimed in claim 1 wherein the sheet is made of a plastics material and further including a heating means for heating said die such that said facing edge heats the folded portion of the sheet.

3. An apparatus for making a fold as claimed in claim 2 wherein said bend means comprises an extended portion of said die above said facing edge and displacement means for moving said extended portion from a position below the sheet to a position adjacent the top of said folding edge of said shim whereby the tangential bending is provided.

4. An apparatus for forming a flat jacket having an exact interior height by folding an elongate flat sheet having a plurality of side wings comprising:
   a flat plate on which the flat sheet is located;
   a flat shim having a transverse folding edge and a plurality of side folding edges corresponding to the number of side wings, said folding edges being rounded in vertical cross section and having a thickness equal to the desired interior height;
   a position means for positioning said shim on the flat sheet with said folding edges adjacent to the places on the flat sheet where the folds are made;
   a transverse bend means for tangentially bending a substantial portion of the sheet along a transverse line of the sheet approximately 90° on said transverse folding edge;
   a transverse die having a facing edge, said facing edge having a mating surface with respect to said transverse folding edge;
   a transverse push means for pushing said facing edge of said transverse die against said transverse folding edge of said shim such that the 90° folded substantial portion of the sheet is further folded to approximately 180° so that the substantial portion covers at least most of the remainder of the sheet except for the side wings and such that an exact interior height adjacent the transverse fold is provided;
   a plurality of side bends means operatively associated with a respective one of said side folding edges for tangentially bending a respective one of the side wings about a respective one of said folding edges approximately 90°;
   a plurality of side dies operatively associated with a respective one of said side folding edges, each said side die having a facing edge with each facing edge having a mating surface with respect to the associated side folding edge;
   a plurality of side push means operatively associated with a respective one of said side dies for pushing a respective facing edge of a respective side die against a respective side folding edge of said shim such that the respective 90° folded side wing is further folded to approximately 180° so that each side wing overlaps a portion of the substantial portion of the sheet previously folded and such that an exact interior height adjacent each fold is provided; and
   an attaching means for attaching said side wings to the underlying portions of the substantial portion of the sheet such that the flat jacket is provided.

5. An apparatus as claimed in claim 4 further including a locating means for positioning said flat sheet precisely on said flat plate.

6. An apparatus as claimed in claim 4 further including a removing means for removing the formed jacket from said shim.

7. An apparatus as claimed in claim 4 wherein the flat sheet is made of a plastics material and further including a heating means for heating said transverse die and said side dies such that said facing edges of said dies heat the folded portions of the sheet.

8. An apparatus as claimed in claim 7 wherein said attaching means comprises a plurality of heat stakes which are pressed against the folded side wings to fuse said side wings to said substantial portion.

9. An apparatus as claimed in claim 4 wherein said transverse bend means and said side bend means comprise an extended portion of said transverse die and said side dies above said facing edges, respectively, and respective displacement means for moving said extended portions from a position below the sheet to a position above the top of the respective folding edge of said shim whereby the tangential bending is provided at each respective folding edge.

10. An apparatus as claimed in claim 9 wherein said displacement means and said push means comprise a respective cam and a respective cam follower operatively associated with each said respective die such that said respective cam causes said respective die to move said respective extended portion for tangential bending and subsequently to push said respective die for further folding.

11. An apparatus as claimed in claim 8 further including a top plate and a pressing means for pressing said top plate against the substantial portion of the flat sheet as the side wings are folded such that the flat sheet is held stationary on said shim.

12. An apparatus for forming a plurality of flat jackets having an exact interior height by folding a rectangular flat sheet having two side wings comprising:
   a plurality of forming devices, each said device including
      a flat plate on which the flat sheet is located,
      a flat shim having a transverse folding edge and two side folding edges, said folding edges being rounded in vertical cross section and having a thickness equal to the desired interior height,
      a position means for positioning said shim on the flat sheet with said folding edges adjacent to the places on the flat sheet where the folds are made, a transverse bend means for tangentially bending a substantial portion of the sheet along a transverse line of the sheet approximately 90° on said transverse folding edge, a transverse die having a facing edge, said facing edge having a mating surface with respect to said transverse folding edge, a transverse push means for pushing said facing edge of said transverse die against said transverse folding edge of said shim such that the 90° folded substantial portion of the sheet is further folded to approximately 180° so that the substantial portion covers at least most of the remainder of the sheet except for the side wings and such that an exact interior height adjacent the transverse fold is provided, two side bend means operatively associated with a respective one of said side folding edges for tangentially bending a respective one of the side wings about a respective one of said folding edges approximately 90°, two side dies operatively associated with a respective one of said side folding edges, each said side die having a facing edge with each facing edge having a mating surface with respect to the associated side folding edge, two side push means operatively associated with a respective one of said side dies for pushing a respective facing edge of a respective side die against a respective side folding edge of said shim such that the respective 90° folded side wing is further folded to approximately 180° so that each side wing overlaps a portion of the substantial portion of the sheet previously folded and such that an exact interior height adjacent each fold is provided, and an attaching means for attaching said side wings to the underlying portions of the substantial portion of the sheet such that the flat jacket having the exact interior height desired is formed;

a conveying means on which said plurality of forming devices are spaced equally for conveying said forming devices along a predetermined path;

a loading means located along the path for depositing a single flat sheet taken from a stack of the sheets onto said flat plate of each said forming device as each said forming device passes said loading means; and a removing means located along the path for removing each formed jacket from said shim of each forming means as said forming means passes said removing means.

13. An apparatus as claimed in claim 12 wherein said removing means comprises two opposed rollers rotating in opposite directions, one of said rollers being movable with respect to the other such that as the rollers are apart said shim on which the flat jacket is formed is located between said rollers and as the two rotating rollers come together the jacket is engaged on either side by said rollers and conveyed off of said shim.

14. An apparatus as claimed in claim 12 wherein said loading means comprises a vacuum pickup which transports a single sheet from the stack of sheets to said flat plate.

15. An apparatus as claimed in claim 12 wherein said conveying means is a turntable which is indexed and stopped to align each forming device sequentially with said loading means and which cyclically brings each forming device back to said loading means.

16. An apparatus as claimed in claim 12 wherein the flat sheets are made of a plastics material, wherein said attaching means of each forming device comprises a plurality of heat stakes which are pressed against the folded side wings to fuse said side wings to said substantial portion, and further including a heating means for heating said transverse die and said two side dies of each forming device such that said facing edges of said dies heat the folded portions of the sheet.

17. An apparatus as claimed in claim 12 wherein said transverse bend means and said two side bend means of each said forming device comprise an extended portion of said transverse die and said two side dies above said facing edges, respectively, and respective displacement means for moving said extended portions from a position below the sheet to a position above the top of the respective folding edge of said shim whereby the tangential bending is provided at each respective folding edge.

18. An apparatus as claimed in claim 17 wherein said displacement means and said push means of said forming devices comprise a respective cam for said transverse dies and said two side dies which are disposed along the path and respective cam followers operatively associated with each of said dies of each said forming device which engage a respective said cam such that said cams cause each said die to move respective said extended portions for tangential bending and subsequently to push said respective die for further folding.

19. An apparatus as claimed in claim 18 wherein each said forming means further comprises a top plate and a cam follower operatively associated with said top plate, and further including a cam disposed along the path on which each said top plate cam follower travels such that each said top plate presses against the substantial portion of the associated flat sheet as the side wings are folded to hold the flat sheet stationary on said shim.

* * * * *